United States Patent [19]

Igarashi

[11] 4,138,357

[45] Feb. 6, 1979

[54] THERMOCHROMIC MATERIAL

[75] Inventor: Akira Igarashi, Fujimiya, Japan

[73] Assignee: Fuji Photo Film Co., Ltd., Minami-ashigara, Japan

[21] Appl. No.: 796,284

[22] Filed: May 12, 1977

[30] Foreign Application Priority Data

May 19, 1976 [JP] Japan .................................. 51-57670

[51] Int. Cl.$^2$ .................................................. C09K 3/00

[52] U.S. Cl. .............................. 252/188.3 R; 252/408; 73/356

[58] Field of Search ......................... 252/408, 188.3 R; 73/356; 428/913

[56] References Cited

U.S. PATENT DOCUMENTS

| | | | |
|---|---|---|---|
| 3,256,518 | 6/1966 | Crane | 73/356 |
| 3,816,335 | 6/1974 | Evans | 252/408 |
| 3,895,173 | 7/1975 | Adachi | 428/913 X |
| 3,916,068 | 10/1975 | Kohmura et al. | 428/411 X |
| 3,978,270 | 8/1976 | Glanz et al. | 428/913 |

*Primary Examiner*—Benjamin R. Padgett
*Assistant Examiner*—J. L. Barr
*Attorney, Agent, or Firm*—Sughrue, Rothwell, Mion, Zinn and Macpeak

[57] ABSTRACT

A thermochromic material, and a heat sensitive recording material containing the same, comprising a substantially colorless electron donating color former capable of forming a color upon reacting with an electron accepting acid compound and a compound represented by the general formula HOArCOOR wherein R represents an organic group having 1 to about 10 carbon atoms and Ar represents an aromatic nucleus.

11 Claims, No Drawings

THERMOCHROMIC MATERIAL

BACKGROUND OF THE INVENTION

1. Field of the Invention

This invention relates to a thermochromic material and a heat sensitive recording material based on the thermochromic material.

2. Description of the Prior Art

Various thermochromic compounds which change in color due to change in temperature are known. Examples of known thermochromic compounds include inorganic compounds such as $CoCl_2$, $2(CH_2)_6N_4.10H_2O$, $PbCrO_4$, etc., and organic compounds such as the spiropyrans, bianthrone, dixanthylene, chloresteric liquid crystals, etc. Such compounds are used as temperature indicating paints, etc.

Except for a few examples, these compounds cannot meet the practical requirement of the ability to visually indicate temperature differences since they have various drawbacks, including a rather rapid deterioration during repeated temperature cycling, insufficient color change, a poor fastness to ultraviolet light, a relatively high cost, etc.

SUMMARY OF THE INVENTION

It has now been found that a substantially colorless electron donating color former (which will be referred to as a color former hereinafter) which is not at all thermochromic per se behaves as an excellent thermochromic material when mixed with an oxybenzoic acid ester represented by the following general formula (I)

$$HOArCOOR \qquad (I)$$

wherein R represents an organic group containing from 1 to about 13 carbon atoms, and Ar represents an aromatic nucleus.

Accordingly this invention in one embodiment provides a thermochromic material comprising a mixture of (1) a substantially colorless electron donating color former capable of forming a color upon reacting with an electron accepting acidic material, and (2) at least one compound represented by the following general formula (I)

$$HO—Ar—COOR \qquad (I)$$

wherein R represents an organic group containing 1 to about 13 carbon atoms, and Ar represents an aromatic nucleus.

In another embodiment, this invention provides a thermographic recording material comprising a support having thereon a layer of the thermochromic material described above.

DETAILED DESCRIPTION OF THE INVENTION

More specifically, in the above general formula (I) R represents an organic group selected from an alkyl group (e.g., having 1 to 8 carbon atoms), an aralkyl group (e.g., a benzyl group), or an aryl group (e.g., a phenyl group or a naphthyl group), and Ar represents an aryl group (e.g., a phenyl group). Ar may be substituted with one or more of an alkyl group (e.g., a methyl group or an ethyl group), a nitro group, a halogen atom (e.g., a chlorine atom or a bromine atom), an acyl group (e.g., an acetyl group), an alkoxy group (e.g., a methoxy group), etc. An alkyl group having 2 to 4 carbon atoms is preferred. Preferably, the steric relationship between the HO— group and the —COOR group is an o- or p-relationship.

The thermochromic material of the present invention is substantially colorless or is quite pale in color below a certain temperature and instantaneously develops a very dense color upon heating. Further, by selecting suitable color formers or using several different color formers in combination, any color hue after development of a color as desired can be obtained.

Also, the rate of fading (i.e., reversion to the substantially colorless condition) freely depending on temperature decrease over a wide range can be controlled by a suitable selection of the compound represented by the general formula (I). In the extreme case, a return to the original, substantially colorless state can be completed in several seconds after the source of heat is removed. A thermochromic system which requires several days for complete fading is also possible. The color density after fading is substantially equal to that prior to development of a color, and substantially no color density decrease for the colored state and no background color density increase for the colorless state are observed over a number of temperature increase and decrease cycles.

As has been described hereinbefore, the thermochromic material in accordance with the present invention possesses a number of advantages including a complete lack of residual color in the colorless state, an ability to adjust the color hue, color density, coloring temperature, and fading speed over a wide range, a substantial freedom from deterioration during repeated usage, an ease of handling, a low production cost, etc.

Accordingly, practical applications are not limited only to thermographic recording materials, but can be extended to applications such as temprature indicating agents, graphic displays and other technical areas where visualization of thermal energy is required.

The structure or the nature of the color formers used in the present invention does not specifically influence the essential features of the present invention, provided that the color former can react with an electron accepting acid material to form a colored substance. Thus, one can utilize a variety of color formers.

Suitable color former compounds include, for example, triarylmethane derivatives, diarylmethane derivatives, xanthene compounds, thiazine compounds, spiropyran compounds, etc. Specific examples of triarylmethane derivatives include 3,3-bis-(p-dimethylaminophenyl)-6-dimethylaminophthalide (i.e., crystal violet lactone), 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-6-dimethylaminophthalide, 3,3-bis(9-ethylcarbazole-3-yl)-5-dimethylaminophthalide, 3,3-bis(2-phenylindol-3-yl)-5-dimethylaminophthalide, 3-p-dimethylaminophenyl-3-(1-methylpyrol-2-yl)-6-dimethylaminophthalide, etc.; suitable examples of diarylmethane derivatives include 4,4'-bis-dimethylaminobenzohydrin benzyl ether, N-halophenyl-leucoauramine, N-2,4,5-trichlorophenyl-leucoauramine, etc.; specific examples of xanthene compounds include rhodamine B-anilinolactam, rhodamine B-p-nitroanilinolactam, rhodamine B-p-chloroanilinolactam, 3-dimethylamino-7-methoxyfluoran, 3-diethylamino-7-methoxyfluoran, 3-diethylamino-6-methoxyfluoran, 3-diethylamino-7-chlorofluoran, 3-diethylamino-7-chloro-6-methylfluoran, 3-diethylamino-6,8-dimethylfluoran, 3-diethylamino-7-acetylmethylaminofluoran, 3-diethylamino-7-methylaminofluoran, 3,7-diethylaminofluoran, 3-diethylamino-7-dibenzylaminofluoran, 3-diethylamino-7-methylbenzylaminofluoran, 3-diethylamino-7-phenylamino-6-methylfluoran, 3-diethylamino-7-chloroethylmethylaminofluoran, 3-diethylamino-7-dichloroethylaminofluoran, etc.; suitable examples of thiazine compounds include benzoylleucomethylene blue, p-nitrobenzylleucomethylene blue, etc.; exemplary spiro compounds include 3-methyl-spiro-dinaphthopyran, 3-ethyl-spiro-dinaphthopyran, 3,3′-dichloro-spiro-dinaphthopyran, 3-benzyl-spiro-dinaphthopyran, 3-methyl-naphtho-(3-methoxybenzo)spiropyran, 3-propyl-spiro-dibenzopyran, etc., and the mixtures thereof.

The oxybenzoic acid ester which is represented by the general formula (I) and which is used in conjunction with the color former may be liquid at room temperature (about 20°-30° C.), in which case the colorless state can be restored by cooling the material below room temperature. Particularly useful are those esters which are solid at room temperature and have a melting point between about 50 and about 200° C. This melting point range is associated with the fact that thermochromic materials are usually expected to exhibit color changes which mean either or both of a change in hue or/and a change in color density between about 0° C. and about 200° C. A most preferred ester is a p-oxybenzoic acid ester which gives rise to marked changes in color in the range between about 50° C. and about 150° C.

Some specific examples of oxybenzoic acid esters are shown below although of course the present invention is not too be construed as being limited to these examples.

1.

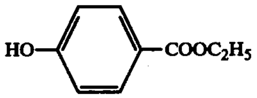

2.

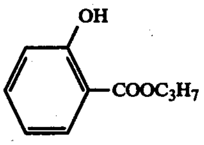

3.

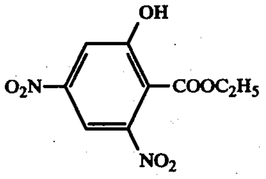

4.

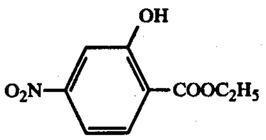

5.

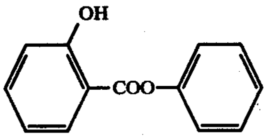

-continued

6.

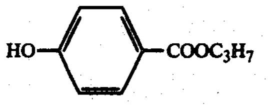

7.

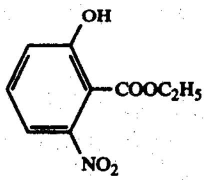

8.

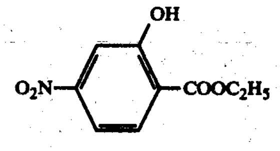

9.

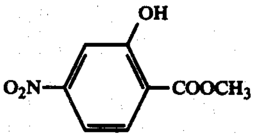

10.

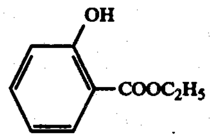

11.

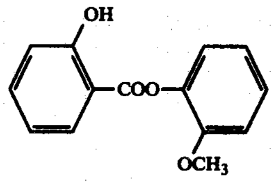

12.

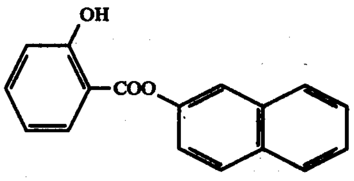

13.

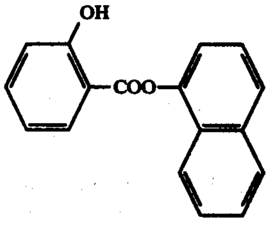

14.

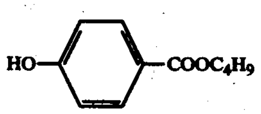

15.

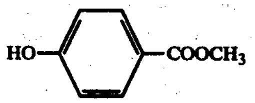

16.

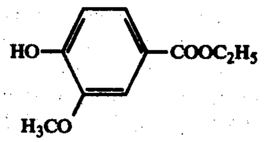

-continued

17.
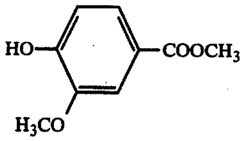

18.
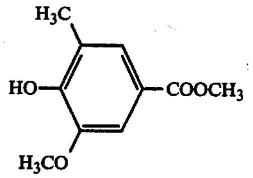

19.
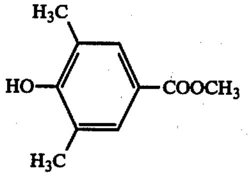

20.
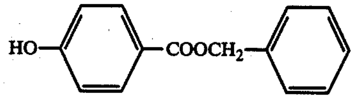

21.
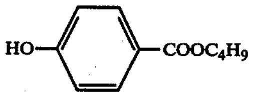

22.
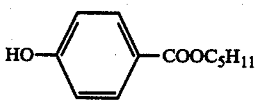

23.
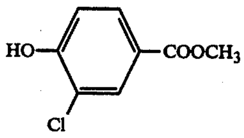

24.
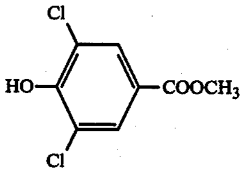

These oxybenzoic acid esters may be used individually or as a combination thereof. Preferred oxybenzoic acid esters are those of the formula

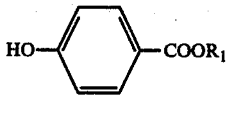

wherein $R_1$ is an alkyl group having 1 to 8 carbon atoms or the formula

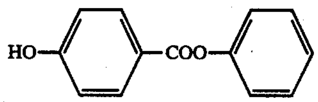

General procedures for manufacturing the thermochromic material of the present invention and the thermographic recording material based thereupon are described below in detail.

A suitable amount of the color former which can be used is about 0.01 to about 50, more preferably 1 to 20 parts by weight per 100 parts by weight of the oxybenzoic acid ester. The lower limit for the amount of color former used is generally defined by the optical density in the colored state desired, while the upper limit is determined by the background density acceptable for the colorless state and also by the manufacturing cost. A mixture comprising at least one color former and at least one oxybenzoic acid ester is dissolved in a suitable solvent system such as ethyl acetate, benzene, toluene, butyl acetate, methylene chloride, etc. The resulting solution is coated on a substrate such as paper, a polyethylene terephthalate film, paper laminated with aluminum, etc. directly or after dispersion in water together with a binder such as polyvinyl alcohol, a styrene-maleic anhydride copolymer, an isobutylenemaleic anhydride copolymer, etc. in a binder amount of about 10 to about 30% by weight to the total amount of the oxybenzoic acid ester and the color former. Alternatively, the mixture of the color former and the oxybenzoic acid ester is charged in a transparent cell. Further, depending on the specific requirements a pigment such as titanium dioxide or a desensitizing agent such as an organic amine can be added e.g., in an amount up to about 200% by weight based on the oxybenzoic acid ester in order to improve the whiteness in the colorless state or to reduce fog. To satisfy other requirements such as, for example, developing color by passing an electric current therethrough causing Joule's heat to form, an agent rendering the material electrically conductive including cuprous iodide, stannous oxide and zinc oxide and metallic powders such as aluminum powders can be incorporated therein. A suitable coating amount of the thermochromic material of the present invention for a thermographic element can range from about 0.2 to about 20 g/m$^2$, preferably 1 to 8 g/m$^2$.

Upon heating a thermographic recording material prepared using such procedures, a color is developed. The temperature at which a color is formed is mainly determined by the kind of oxybenzoic acid ester employed, and so is the color fading rate when the temperature decreases. The mechanism of color development is probably based on a melting of the oxybenzoic acid ester and on a reaction of the melted ester with the color former. On the other hand, the mechanism of the restoration of colorless state is not clear at present, but appears to be associated with a crystallization of the oxybenzoic acid ester.

Application of thermal energy to the thermographic or thermochromic material of the present invention is not limited to direct heating, but may involve other suitable techniques including passing an electric current therethrough (to form Joule's heat), irradiation with an electron beam or with a laser beam, etc.

The following examples are given to illustrate the present invention in greater detail. Unless otherwise indicated, all parts, percents, ratios and the like are by weight.

EXAMPLE 1

In 100 g of ethyl acetate were dissolved 1 g of crystal violet lactone and 100 g of propyl p-oxybenzoate. The resulting solution was coated on a sheet of paper with a basis weight of 40 $g/m^2$ using a coating bar. The coated sheet was dried at 60° C.

The sheet material thus prepared appeared substantially colorless, having an optical density of 0.09. When an iron piece at 150° C. was brought into contact with this sheet, the optical density increased to 1.02, and decreased to 0.12 in 10 seconds on removal of the heated piece.

The density measurement was carried out using a ToshibaBeckmann Densitometer, Type BD at a wavelength of 605 mμ.

EXAMPLE 2

A 40 $g/m^2$ base paper was coated with a solution comprising 1 g of crystal violet lactone, 20 g of isobutyl p-oxybenzoate dissolved in 100 g of ethyl acetate with a coating bar and dried at 60° C.

The appearance of the resulting sheet was pale blue, which quickly turned deep blue, when the sheet was heated to 120° C. at which temperature; the optical density was 1.15. When the heated sheet was left at room temperature, it was observed that the relationship between density D at 610 mμ and time t (hr) could be expressed for t from about 1 to 5 hours by the formula;

$$D = -(1.3/7.3)\,t + 1.3$$

After 10 hours of storage at room temperature, the sheet was again heated to 120° C. whereby the same optical density of 1.15 was obtained. Further, the behavior of color fading on room temperature storage also followed the above-mentioned formula.

EXAMPLE 3

3 g of 2,2'-spiro-bis-[benzo(f)cromene] and 20 g of propyl p-oxybenzoate were pulverized and mixed with 100 g of a 5% polyvinyl alcohol aqueous solution in a ball mill for 24 hours. The resulting dispersion was coated on a 50 $g/m^2$ base paper. The sheet was dried at 40° C. thus producing a white recording paper.

When heated to 150° C., the recording sheet turned blue whereby the optical density was 1.1. When the sheet was left at room temperature, the optical density decreased to 0.2 in about one minute.

EXAMPLE 4

3 g of crystal violet lactone, 30 g of ethyl 2-oxy-5-nitrobenzoate, and 20 g of cuprous iodide were pulverized and blended with 150 g of a 5% polyvinyl alcohol aqueous solution in a ball mill for 24 hours. The resulting mixture was coated on a sheet of base paper which had been provided with a 7 micron thick sub coating resulting from 35 g of cuprous iodide and 100 g of a 5% polyvinyl alcohol aqueous solution blended in a ball mill, and the coated sheet was dried at 40° C.

The recording sheet thus obtained, having a pale brown appearance, turned brilliant blue when contacted with a 0.2 mm diameter tungsten stylus to which 200 volts were applied and swept at a speed of 500 m/min. The colored image disappeared in about 24 hours.

EXAMPLE 5

5 g of crystal violet lactone was melted in 50 g of ethyl p-oxybenzoate melted at 120° C., and then 20 g of titanium dioxide was dispersed therein. The resulting dispersion was placed in a glass cell which had a thickness of 1 mm.

The contents had a white color at room temperature, and when heated above 110° C. the contents turned deep blue.

EXAMPLE 6

Into a ball mill were charged and mixed the following components;

| | |
|---|---|
| 3-Diethylamino-7-dibenzylaminofluoran | 10 g |
| Propyl p-Oxybenzoate | 50 g |
| Methyl 4-Oxy-3-methoxybenzoate | 10 g |
| Ethanolamine | 2 g |
| 47% Styrene-Butadiene Copolymer Latex | 40 g |
| Water | 200 g |

The components were mixed for 24 hours, and the resulting mixture was coated on a glass plate, which was left to dry at room temperature.

The coated layer with a semi-transparent appearance turned deep green when heated to about 50° C. This color faded to a pale green after one day of storage at room temperature.

While the present invention has been described in detail with reference to the specific embodiments thereof, it is apparent to one skilled in the art that various changes and modification can be made therein without departing from the scope and the spirit of the present invention.

What is claimed is:

1. A thermochromic material comprising a mixture of (1) a substantially colorless electron donating color former capable of forming a color upon reacting with an electron accepting acidic material, and (2) at least one compound represented by the following general formula (I)

HO—Ar—COOR (I)

wherein R represents an alkyl group containing 2 to 8 carbon atoms, a phenyl group substituted with a methoxy group, a benzyl group or a napthyl group, and Ar represents a benzene nucleus, or a benzene nucleus substituted with one or two of a nitro group, an alkyl group containing 1 to 4 carbon atoms, a methoxy group or a halogen atom, said compound being solid at room temperature and having a melting point between about 50° C. and about 200° C.

2. The thermochromic material of claim 1, wherein the steric relationship between said HO— group and said —COOR group is an o- or p-relationship.

3. The thermochromic material of claim 1, wherein said color former is a triaryl methane derivative, a diaryl methane derivative, a xanthene compound, a thiazine compound or a spiropyran compound.

4. The thermochromic material of claim 1, wherein said compound represented by the general formula (I) has the general formula

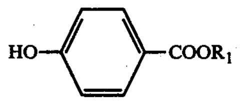

wherein $R_1$ represents an alkyl group containing 2 to 8 carbon atoms.

5. A thermographic recording material comprising a support having thereon a layer of the thermochromic material of claim 1.

6. The thermographic recording material of claim 5, wherein the steric relationship between said HO— group and said —COOR group is an o- or p-relationship.

7. The thermographic recording material of claim 5, wherein said color former is a triaryl methane derivative, a diaryl methane derivative, a xanthene compound, a thiazine compound or a spiropyran compound.

8. The thermographic recording material of claim 5, wherein said compound represented by the general formula (I) has the general formula

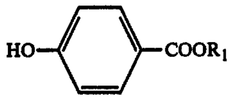

wherein $R_1$ represents an alkyl group containing 2 to 8 carbon atoms.

9. The thermochromic material of claim 1, wherein said mixture is charged in a transparent cell.

10. The thermochromic recording material of claim 5, wherein said support has thereon a layer containing an agent rendering the layer electrically conductive.

11. The thermochromic recording material of claim 10, wherein said agent is cuprous iodide, stannons oxide, zinc oxide or metallic powders.

* * * * *